（12）United States Patent
Wright et al.

(10) Patent No.: US 7,156,470 B1
(45) Date of Patent: Jan. 2, 2007

(54) WHEEL TRIM HUB COVER

(76) Inventors: James P. Wright, P.O. Box 27,
Cookeville, TN (US) 38503; Timothy L. Bates, 156 Whites Point Dr., Cookeville, TN (US) 38506; Barry L. Roberts, 218 W. Speck Rd., Cookeville, TN (US) 38506

( * ) Notice: Subject to any disclaimer, the term of this patent is extended or adjusted under 35 U.S.C. 154(b) by 0 days.

(21) Appl. No.: 11/176,936

(22) Filed: Jul. 6, 2005

Related U.S. Application Data

(62) Division of application No. 10/878,219, filed on Jun. 28, 2004.

(51) Int. Cl.
B60B 7/14 (2006.01)
B60B 7/06 (2006.01)

(52) U.S. Cl. .............. 301/108.1; 301/37.31; 301/108.4

(58) Field of Classification Search .......... 301/37.101, 301/37.28, 37.102, 37.34, 37.371–37.373, 301/37.376, 108.1–108.4; D12/204, 207, D12/213
See application file for complete search history.

(56) References Cited

U.S. PATENT DOCUMENTS

D302,145 S   7/1989  Patti ............................ 12/207
4,932,724 A  6/1990  Wright ............................ 7/6
5,096,263 A  3/1992  Wright ............................ 7/6
5,193,884 A  3/1993  Sheu et al. ...................... 7/6
5,205,614 A  4/1993  Wright ............................ 7/14
5,205,616 A  4/1993  Wright ............................ 7/14
5,277,478 A  1/1994  Wright ............................ 7/12
5,286,093 A  2/1994  Wright ............................ 7/14
5,645,324 A  7/1997  Wright et al. .................... 7/6
5,669,672 A  9/1997  Wright et al. ................... 7/10
5,676,430 A 10/1997  Wright et al. ................... 7/10
5,695,257 A 12/1997  Wright et al. .................... 7/6
5,722,735 A  3/1998  Wright et al. .................... 7/6
5,890,773 A  4/1999  Wright et al. ................... 27/0
6,152,537 A 11/2000  Wright et al. .................... 7/6
6,378,955 B1* 4/2002 Adamson et al. ......... 301/108.4
6,467,852 B1* 10/2002 Polka ....................... 301/37.32
6,511,132 B1  1/2003  Wright ............................ 7/14
6,672,680 B1* 1/2004 Polka ....................... 301/108.1

* cited by examiner

Primary Examiner—Jason R. Bellinger
(74) Attorney, Agent, or Firm—Waddey & Patterson, PC; Edward D. Lanquist, Jr.; Phillip E. Walker

(57) ABSTRACT

An attachment system including an attachment sleeve or attachment arm is provided for attaching a wheel cover, or wheel trim to a vehicle. The attachment sleeve attaches to a nut present on the vehicle. The arm located within the axle housing of the wheel cover provides a compression fitting against parts of the rear hub of a vehicle. It is by compression engagement that the attachment sleeve or arm provides attachment of the wheel cover to the vehicle. Also disclosed is an attachment system kit and method of use thereof.

16 Claims, 4 Drawing Sheets

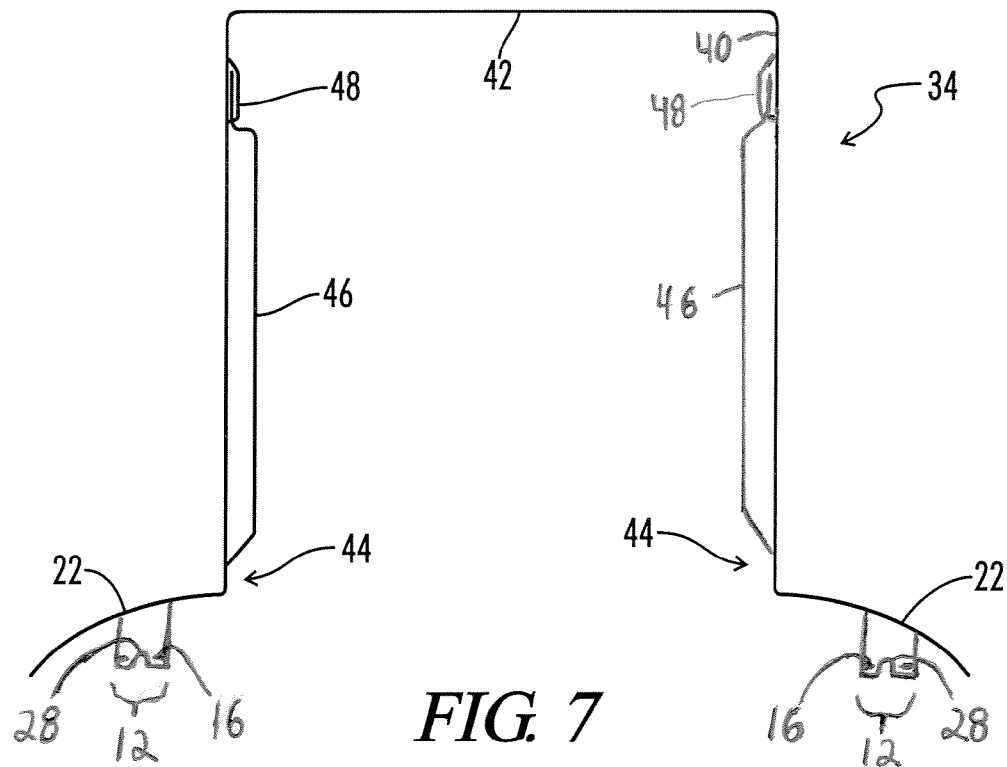
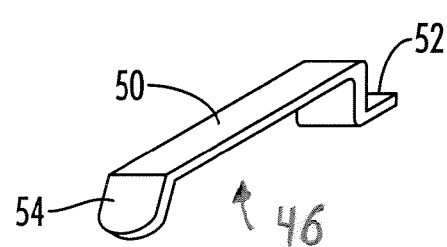
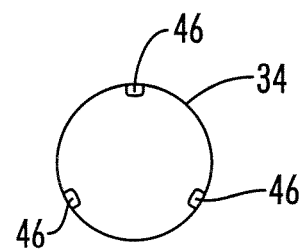
FIG. 7
FIG. 8
FIG. 9

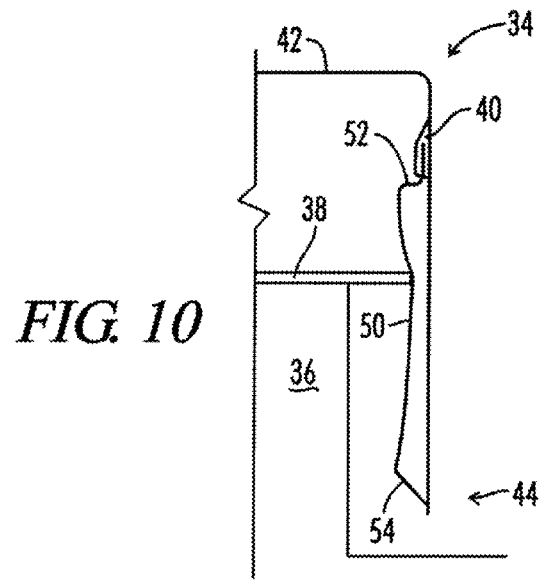
FIG. 10
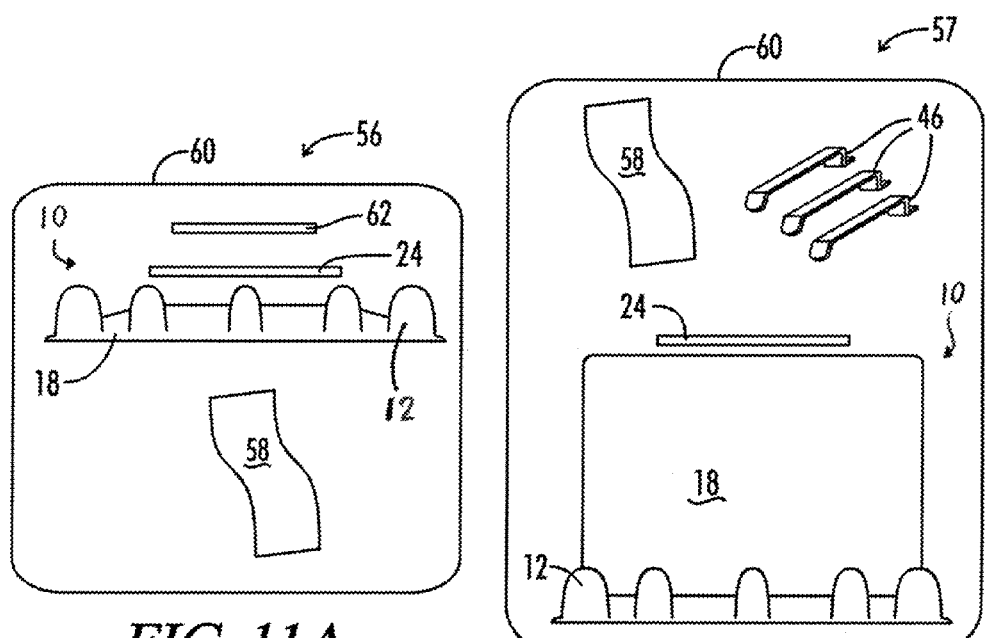
FIG. 11A
FIG. 11B

WHEEL TRIM HUB COVER

This is a divisional application of U.S. patent application Ser. No. 10/878,219 entitled "Wheel Trim Hub Cover" filed Jun. 28, 2004.

BACKGROUND OF THE INVENTION

The present invention provides an attachment system used for securing a wheel cover to a wheel of a vehicle. The invention generally relates to wheel trim, or wheel coverings for commercial vehicles.

Various devices and structures have commonly been used to secure wheel covers to the wheels of vehicles in order to enhance the aesthetic values of the vehicle. Such wheel covers commonly include a large number of parts which require tools in order to affix the covers to the vehicle's wheels. Such wheel covers require an extended period of time for installation due to the excessive number of parts and lack of familiarity of a user with the many parts.

Certain wheel cover systems require installation with special tools which complicate the process. If the tools are not used properly, installation may not be proper and the cover may detach while the vehicle is in motion. Additionally, retightening or resecuring such a wheel cover system requires use of the tool which was required upon original installation. Furthermore, the tool is required for removing of the wheel cover in order to access the lug nuts and other vehicle wheel parts located behind the cover.

The currently available attachment systems do not provide maximal aesthetic appeal. Current wheel covers sacrifice a smooth flowing design due to the many part which must be assembled in order to provide secure attachment to the vehicle's wheel.

What is needed, then, is a wheel trim attachment system which requires few parts in order to securely attach to a vehicle. Such an attachment system should not require the use of any tools for installation or removal. A system is needed that will reduce the number of steps in the installation process and still result in secure attachment to the vehicle.

SUMMARY OF THE INVENTION

The present invention is a wheel trim attachment system, kit, and method of use thereof for attaching a wheel trim to the wheel of a vehicle. Disclosed herein is a one piece wheel trim that is easy to install. The one piece wheel trim overcomes the disadvantages associated with the currently available decorative attachment assemblies which have numerous parts and require a significant amount of time for installation. The attachment system includes a wheel cover having at least one attachment sleeve. The attachment sleeve defines an opening and the sleeve has at least one notch. The attachment sleeve may have a rib. The wheel cover may have an arm with a body which may be flexed in the direction of an axle housing in order to provide an attachment. The method of attaching a wheel cover to a vehicle includes providing a wheel cover having at least one attachment sleeve and engaging a nut on the vehicle with the attachment sleeve. The method may also include providing a wheel cover having an axle housing, the axle housing having a plurality of arms and engaging the axle plate of a vehicle with the plurality of arms of the axle housing.

In certain embodiments of the present invention, the attachment system includes an attachment sleeve defining an opening, the opening having a rib, and the wheel cover attached to the attachment sleeve. The attachment sleeve may have an engagement end which has a rib. In certain embodiments, the rib may have a height of from about 0.5 millimeters to about 5 millimeters. The wheel cover may have a removable center portion. In certain embodiments the opening defined by the attachment sleeve may be cylindrical, oval, or hexagonal.

In certain embodiments the wheel cover attachment device includes a wheel cover having an axle housing. The axle housing having an interior surface and an arm attached to the interior surface. In certain embodiments the arm has a body, a first end and a second end, with the first end attached to the interior surface of the axle housing. In certain embodiments the second end of the arm may contact the proximate end of the axle housing. The body of the arm may be separated from the interior surface of the axle housing by from about 5 millimeters to 20 millimeters.

In certain embodiments the apparatus for attaching a wheel cover to a vehicle includes a wheel cover having a periphery portion and an axle housing. A plurality of arms attached to the axle housing to the cylindrical interior of the axle housing and an attachment cylinder attached to the periphery portion of the wheel cover. In other embodiments of the present invention, the body of the arm is capable of flexing in the direction of the interior surface of the axle housing. In certain embodiments the attachment cylinder has a rib for engaging a nut. In still other embodiments, the attachment cylinder has an engagement end, wherein the engagement end has a plurality of notches for providing flexibility for the engagement and disengagement of the nut. In still other embodiments the rib may be a line of engagement for engagement with the nut.

The present invention also discloses a wheel trim attachment kit including an instruction set for attaching a wheel cover to a vehicle, a wheel cover having an attachment sleeve, a cover to engage the wheel cover, and a package containing the instruction set, the wheel cover, and end cover. In other embodiments the kit also includes indicia capable being attached to the cover. In still other embodiments, the kit also includes a plurality of arms for engagement with the wheel cover.

The present invention also discloses a method of attaching a wheel cover to a vehicle including providing a wheel cover, having an attachment sleeve, having an opening, the opening having a rib, and engaging a nut with the opening of the attachment sleeve wherein the nut is removably engaged to the wheel cover. In other embodiments, the opening of the attachment sleeve does not have a rib. In certain embodiments of the present invention, the wheel cover may also have an opening. In still other embodiments, the method includes removably engaging a cover with the opening of the wheel cover. In still other embodiments, the method includes providing a wheel cover, having an axle housing, the axle housing having a plurality of arms, and engaging an axle plate with the plurality of arms of the axle housing.

Therefore, one aspect of the present invention is the provision of an attachment system which may be used to attach a wheel cover, wheel trim, or decorative wheel trim, to the wheel of a vehicle in an expeditious manner.

Another aspect of the present invention is the provision of an apparatus for attaching a wheel cover to the wheel of a vehicle which requires no assembly tools, the wheel trim being a single item.

Yet another aspect of the present invention is the provision of a kit which includes a minimal number of parts so that a wheel cover may be attached to a wheel of a vehicle by following easy-to-understand instructions within a brief period of time.

Another aspect of the present invention is the provision of a method of attaching a wheel cover to a vehicle which may be completed in a manner of about one minute per wheel position.

Yet another aspect of the present invention is an attachment system which securely attaches wheel covers to the wheels of vehicles which may be applied to any vehicle.

BRIEF DESCRIPTION OF THE DRAWINGS

FIG. 7 is a cross section view of a wheel cover with an axle housing and an arm. The figure shows the arm attached to the interior surface of the axle housing. The first end of the arm is attached near the distal end of the axle housing so that the second end of the arm is nearly in contact with the proximate end of the axle housing. Also shown is the periphery of the wheel cover, the area of the wheel cover in which the attachment sleeves (not shown) are located.

FIG. 8 is a perspective view of an arm. The figure shows the body of the arm as well as the first end, which is attached to the axle housing, and the second end, which is not in attachment with the axle housing.

FIG. 9 is a bottom view of the axle housing of the wheel cover. The figure shows the equidistant positioning of the arms, which are attached to the interior surface of the axle housing.

FIG. 10 is a cross section view of a portion of the axle housing. The figure shows the rear hub axle plate compressing the body of the arm towards the surface of the axle housing. The rear hub, including the rear hub axle plate is pushed into the axle housing of the wheel cover past the second end of the arm so that the rear hub axle plate compresses against the body of the arm. The compressed fit results in attachment of the wheel cover to the wheel of the vehicle.

FIG. 11A shows a kit for attaching a front wheel cover to a vehicle wheel. The kit includes packaging which contains one or more front wheel covers, a set of instructions, a plurality of center covers for the wheel covers, and indicia which may be attached to the front wheel covers. FIG. 11B shows a kit for attaching a rear wheel cover to a vehicle wheel. This kit includes packaging which contains one or more rear wheel covers, a set of instructions, a plurality of arms, a plurality of center covers for the wheel covers, and indicia which may be attached to the wheel covers.

DESCRIPTION OF THE PREFERRED EMBODIMENTS

Figure 1:
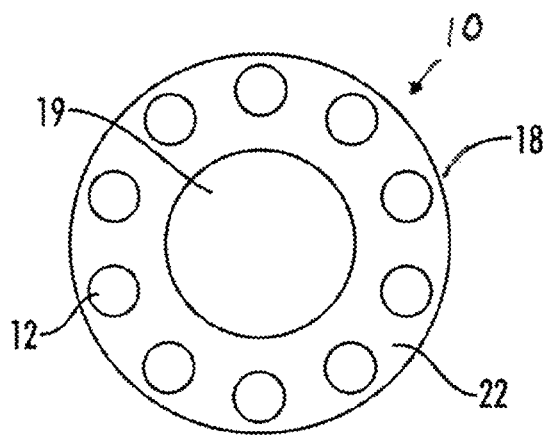
FIG. 1 is a schematic drawing of a bottom view of one embodiment of the present invention. The figure shows a wheel cover with an opening and the plurality of attachment sleeves protruding from the wheel cover.

The present invention disclosed herein is an attachment system 10 for attaching a wheel cover to a vehicle. Also disclosed herein is a method for attaching a wheel cover to a vehicle and a wheel trim attachment kit. The attachment system 10 includes an attachment sleeve 12 which defines an opening 14, and a wheel cover 18 attached to the attachment sleeve 12. Such a wheel cover 18 may include decorative wheel trim. For example, a wheel cover 18 may be a covering, or trim, with or without openings or other decorative aspects. The method of attaching a wheel cover 18 to a vehicle includes engaging a nut 20 with the opening 14 of the attachment sleeve 12, wherein the nut 20 is removably engaged to the wheel cover 18.

Shown in FIG. 1 is the wheel cover 18 and the attachment sleeves 12 located around the periphery 22 of the wheel cover 18. The attachment sleeves 12 are attached to the wheel cover 18 as known in the art, for illustration, but not limitation, by being molded together, mechanically or chemically fastened together. Note that the attachment sleeves 12 and wheel cover 18 are one piece, not multiple pieces which require assembly. Stated another way, that one piece covers the hub, lug nuts, etc., rather than requiring multiple parts as currently known in the art. Also, note that the attachments sleeves 12 are positioned for engagement to lug nuts of a vehicle wheel. In alternate embodiments, the exact positioning of the attachment sleeves 12 may be modified for engagement to lug nuts, or other nuts mentioned herein, of a vehicle wheel. In certain embodiments, a cover 24 may be removably attached to the wheel cover 18. In certain embodiments, the cover 24 may be a pop-out cover, or may have a lip-notch attachment to the wheel cover 18.

Referring back to FIG. 1, there is shown an opening 19 of the wheel cover 18 to which a cover 24, also known as a removable center portion, may be attached. In this embodiment, the opening 19 is covered by removably engaging the cover 24, as further described below. In certain embodiments, the wheel cover 18 may not have an opening 19.

Also, the wheel cover 18 may be for a front wheel, as shown in FIGS. 1 and 11A, or for a rear wheel, as shown in FIGS. 7, 9, 10, and 11B.

Figure 2A:
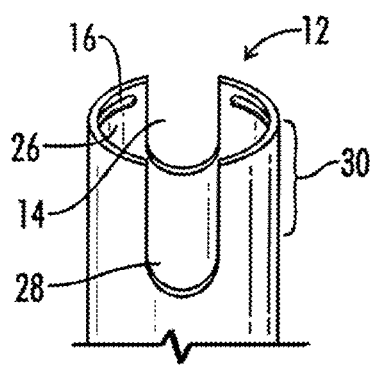
FIG. 2A is a perspective view of an attachment sleeve. The figure shows the engagement end of the attachment sleeve which has a plurality of notches and a rib for engaging a nut (not shown).
Figure 2B:
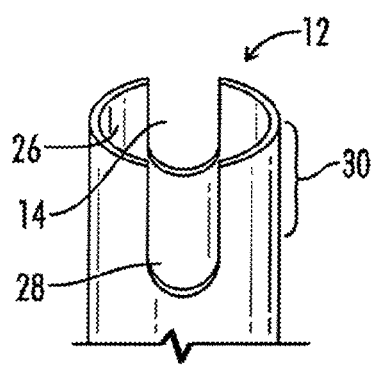
FIG. 2B is a perspective view of an attachment sleeve. This embodiment of the attachment sleeve does not have a rib, but frictionally engages a nut (not shown) based upon the flexibility due to the plurality of notches.

Referring now to FIGS. 2A and 2B, there is shown the attachment sleeve 12 of the attachment system 10. In certain embodiments, shown in FIG. 2A, the attachment sleeve 12 defines the opening 14 and a rib 16 may be present on the interior surface 26. In other embodiments, shown in FIG. 2B, the attachment sleeve 12 may not have a rib 16, referred to as a rib-less attachment sleeve 12. In certain embodiments, the attachment sleeve 12 may have at least one notch 28 in order to allow additional expansion and contraction of the attachment sleeve 12.

The attachment system 10, shown in FIG. 1, including attachment sleeves 12 and wheel cover 18, may be constructed of any rigid material, such as plastic, aluminum, spring steel, and other material known to those of ordinary skill in the art. The attachment system 10 may be made by injection molding, tooling, or other methods known to those of ordinary skill in the art dependent upon the specific material of construction which is used.

Figure 3:
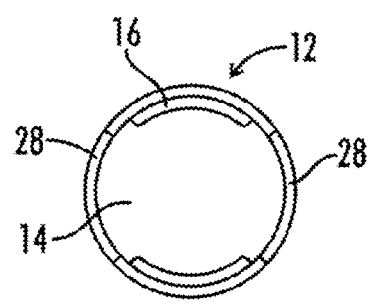
FIG. 3 is a top view of an attachment sleeve. The figure shows the height of the rib which is located within the opening of the attachment sleeve. Also shown are the notches which allow enhanced flexibility of the engagement end of the attachment sleeve.
Figure 4A:
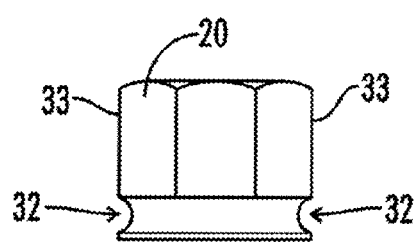
FIG. 4A is an elevated side view of a nut. The figure shows a groove located at the base of the nut into which the rib of the attachment sleeve engages.
Figure 4B:
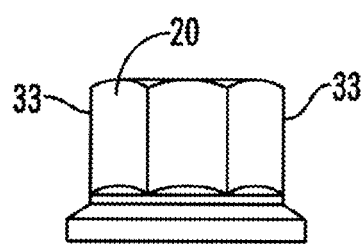
FIG. 4B is an elevated side view of an alternate nut. The figure shows a nut not having a groove which still allows engagement of an attachment sleeve. Either embodiment of nut may be engaged by an attachment sleeve with or without ribs. Although it is preferred to use an attachment sleeve with a rib on a nut with a groove and a rib-less attachment sleeve on a groove-less nut.

Shown in FIG. 3 is one embodiment of the positioning of the rib 16. In certain embodiments, the rib 16 has a height, which is best seen in FIG. 3, of about 0.5 millimeters to 5 millimeters. In alternate embodiments, the rib 16 has a height of about 2 millimeters. In alternate embodiments, the height of the rib 16 may be determined by the user in order to meet the user's specific needs. In still other embodiments, the attachment sleeve 12 may not have a rib 16. Whether or not the attachment sleeve 12 has a rib 16, the shape of the opening 14 defined by the attachment sleeve 12 may be circular or cylindrical. Further, in alternate embodiments, the opening 14 may take a shape such as oval, hexagonal, or other shape which may allow the attachment sleeve 12 to engage a nut 20 as further disclosed herein. Still referring to FIG. 3, the attachment sleeve 12 may have one or more notches 28, as best seen in FIGS. 2A and 2B, in order to enhance movement of the engagement end 30 of the attachment sleeve 12. In alternate embodiments, the engagement end 30 may not have notches 28. In certain embodiments, the rib 16 located on the engagement end 30 is positioned to provide a frictional engagement fit with the groove 32 of the nut 20 as best seen in FIG. 4A. In alternate embodiments, the rib 16 located on the engagement end 30 provides a frictional engagement fit with the nut 20 even though the rib 16 does not engage the groove 32. For example, a frictional engagement fit may be provided based upon the contact between the rib 16 and the lateral surface 33 of the nut 20, best seen in FIGS. 4B and 6B. As further described herein, a nut 20 with a groove 32 may be engaged by an attachment sleeve 12 with a rib 16, or an attachment sleeve 12 without a rib 16. Also, a nut 20 without a groove 32 may be engaged by an attachment sleeve 12 with a rib 16, or an attachment sleeve 12 without a rib 16.

Figure 5:
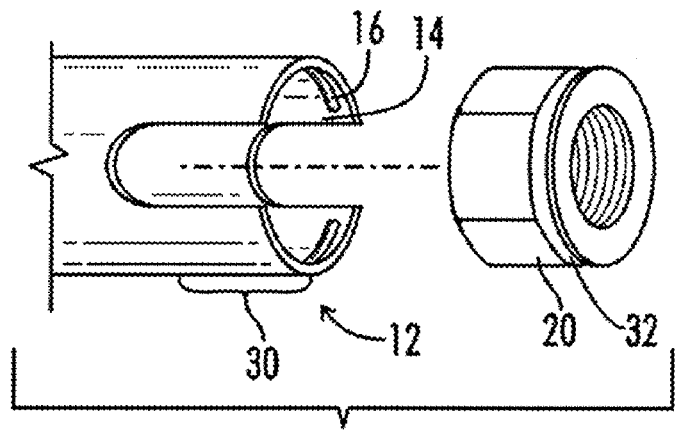
FIG. 5 is a perspective view of a nut in alignment for engagement with an attachment sleeve. The figure shows the rib of the attachment sleeve which will engage the groove (not shown) of the nut. As described herein, the nut may or may not have a groove and the attachment sleeve may or may not have a rib.

Referring to FIG. 5, there is shown the nut 20 positioned for engagement with the attachment sleeve 12. The opening 14 of the engagement end 30 is sized to provide a frictional engagement with the nut 20. In certain embodiments, the opening 14 of the engagement end 30 is sized to be slightly larger than the offset of a hexagonal nut 20, meaning the greatest distance between two opposite points of the hexagon. In other words, the attachment sleeve 12, based upon the presence or absence of a rib 16, is sized to frictionally engage a portion of the nut 20. In other embodiments, the diameter of the engagement end 30 may correspond to a diameter of a lug nut, hub pilot nut, stud pilot nut, or other nuts located in the vicinity of the vehicle's wheel. Further, the exact location of the attachment sleeves 12 on the wheel cover 18 may be modified in order to provide alignment with one or more nuts 20 on a vehicle wheel. In alternate embodiments, the engagement end 30 may correspond to nuts 20 sized as 30–45 millimeters. In still other embodiments, the engagement end 30 may correspond to nuts 20 sized 30–35 millimeters. In other alternate embodiments, the engagement end 30 may correspond to nuts 20 having a size of 36–45 millimeters. In other embodiments, the engagement end 30 may be sized to allow engagement of nuts 20 sized as 19–45 millimeters.

Figure 6A:
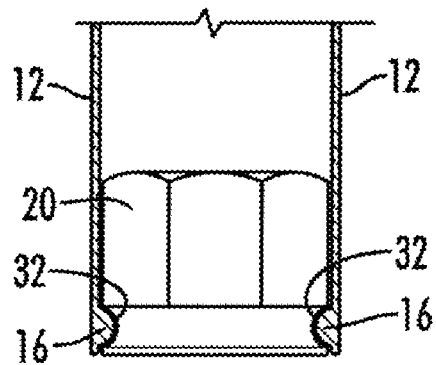
FIG. 6A is a cross sectional view of the attachment sleeve in full engagement with the nut. The figure shows the rib of the attachment sleeve fully engaged with the groove of the nut.
Figure 6C:
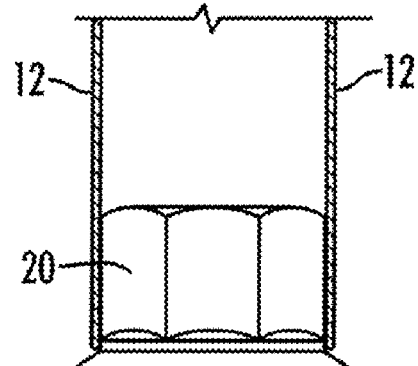
FIG. 6C is a cross sectional view of another embodiment of the attachment sleeve in full engagement with the nut. That figure shows a rib-less sleeve engaging a groove-less nut.
Figure 6B:
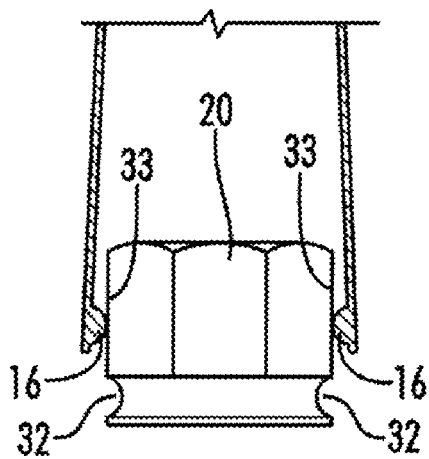
FIG. 6B is a cross sectional view of another embodiment of the attachment sleeve in full engagement with the nut. That figure shows the rib of the attachment sleeve engaged with the lateral surface of the nut. An identical engagement is accomplished with a nut not having a groove.

As best seen in FIG. 6A, upon engagement of the nut 20 with the attachment sleeve 12, the rib 16 is inserted into the groove 32 of the nut 20. In alternate embodiments, rather than a continuous rib 16, the attachment sleeve 12 may have a discontinuous rib 16, a smaller rib 16, or a series of knobs, raises, or bumps, any of which may be used to engage the groove 32 of the nut 20. In other words, a rib 16, or an equivalent thereof, may engage the groove 32. In still other embodiments, as best seen in FIG. 6B, the rib 16 may frictionally engage the lateral surface 33 of the nut 20, while not fitting into the groove 32. For example, an attachment sleeve 12 having a rib 16 may be used to engage a nut 20 not having a groove 32. In yet another embodiment, shown in FIG. 6C, an attachment sleeve 12 not having a rib 16 may engage a nut 20 not having a groove 32. Referring to FIG. 6C, the engagement end 30 of the attachment sleeve 12 frictionally engages the lateral surface 33 of the nut 20.

Referring now to FIG. 7, there is shown a cross-section view of a rear wheel cover 18. The wheel cover 18 has an axle housing 34 which surrounds or covers the rear hub 36 and rear hub axle plate 38. The axle housing 34 has an interior surface 40, a distal end 42, and a proximate end 44.

Still referring to FIG. 7, an arm 46 is attached to the interior surface 40 of the axle housing 34. In certain embodiments, the arm 46 is attached directly to the interior surface 40. In other embodiments, the arm 46 is indirectly attached to the interior surface 40 through a connector 48. In alternate embodiments, the connector 48 may, in fact, be a part of the axle housing 34, thus resulting in the arm 46 being directly attached to the axle housing 34. The arm 46 may be permanently or removably attached to the axle housing 34.

Referring now to FIG. 8, there is shown an embodiment of the arm 46. In certain embodiments, the arm 46 has a body 50, a first end 52, and a second end 54. The arm 46 may be constructed of a flexible material such as plastic, metal, or other pliable material. As best seen in FIG. 9, within the axle housing 34, a plurality of arms 46 are positioned equidistantly about the interior surface 40 of the axle housing 34. In alternate embodiments, the arms 46 may also be positioned in patterns which require distances of separation which are not equal. As seen in FIGS. 7 and 10, the first end 52 of the arm 46 may be removably attached to the interior surface 40 of the axle housing 34. Alternatively, the first end 52 may be permanently attached to the interior surface 40. The second end 54 of the arm 46 may nearly contact the proximate end 44 of the axle housing 34. In certain embodiments, the second end 54 may actually contact the proximate end 44 of the axle housing 44. As best seen in FIGS. 7 and 10, the first end 52 and the second end 54 of the arm 46 function to distance the body 50 of the arm 46 from the interior surface 40 of the axle housing 34. In certain embodiments, the body 50 of the arm 46 is separated from the interior surface 40 of the axle housing 34 by from about 5 millimeters to about 20 millimeters. The arm 46 will be compressed toward the interior surface 40 of the axle housing 34 by an axle plate having a diameter from about 8.25 inches to about 8.56 inches. Upon applying pressure to the second end 54, the portion of the body 50 near that end will become compressed towards the interior surface 40, thus allowing the positioning of an item such as a rear hub axle plate 38 against the body 50 of the arm 46. As best seen in FIG. 10, when compression is provided by an item, such as a rear hub axle plate 38, the arm 46 flexes in order to hold the axle housing 34 of a wheel cover 18 in a desired position.

With regard to the axle housing 34, it may have a cylindrical shape as shown in FIG. 9. In alternate embodiments, the axle housing 34 may have an alternate shape as desired by the user. The wheel cover 18, in addition to having the axle housing 34 as a periphery portion 22. In embodiments with a cylindrical axle housing 34, a plurality of arms 46 may attach to the cylindrical interior surface 40, as shown in FIG. 9. As shown in FIGS. 1 and 7, a plurality of attachment sleeves 12, also known as attachment cylinders, attach to the periphery portion 22 of the wheel cover 18. The arm 46 is capable of flexing in the direction of the interior surface 40 of the axle housing 34, as previously described. The attachment sleeve 12 engages the nut 20 in order to hold or attach the wheel cover 18 to the vehicle. In certain embodiments of the present invention, the attachment system 10 may use a combination of at least one attachment sleeve 12, also known as attachment cylinder in combination with at least one arm 46.

As best seen in FIGS. 11A and 11B, also disclosed herein is a front wheel trim attachment kit 56 and a rear wheel trim attachment kit 57. In addition to the kits shown in FIGS. 11A and 11B, it is noted that those kits may be combined into a single kit. Referring to FIG. 11A, the front wheel trim kit 56 includes an instruction set 58 for attaching a wheel cover 18 to a vehicle, a wheel cover 18 having at least one attachment sleeve 12, a cover 24 to engage the wheel cover 18, and a package 60 containing the above-mentioned items. The package 60 may be any packaging material which is convenient for containing the mentioned items. Examples of package 60 include plastic bag, box, etc. Referring to FIG. 11B, the rear wheel trim kit 57 includes an instruction set 58 for attaching a rear wheel cover 18 to a vehicle, a wheel cover 18 having at least one attachment sleeve 12, a cover 24 to engage the wheel cover 18, at least one arm 46, and a package 60 containing the above-mentioned items. In certain embodiments, either kit may further include indicia 62 capable of being attached to the cover 24 or wheel cover 18. Examples of indicia 62 include any company names or logos, such as adhesive stickers which may be applied to any part of the kit.

The method of attaching a wheel cover 18 to a vehicle, as disclosed herein, includes assembling the parts of the attachment system 10 and attaching the system 10 to a vehicle's wheel. The kits disclosed herein provide a wheel cover 18 which has at least one attachment sleeve 12, the attachment sleeve 12 having an opening 14. Engaging a nut 20 with the opening 14 of the attachment sleeve 12 is accomplished by positioning the wheel cover 18 so that the attachment sleeves 12 are in alignment with the nuts 20 on the vehicle, and pushing the wheel cover 18 into engagement with the nuts 20, so that the nut 20 is removably engaged to the attachment sleeves 12. Since the nut 20 is attached to the vehicle (not shown) the wheel cover 18 will remain attached to the vehicle via the nut 20. In alternate embodiments, the wheel cover 18 has an opening 19, as best seen in FIG. 1, which may be covered by a cover 24, best seen in FIGS. 11A and 11B, by removably engaging the cover 24 with the wheel cover 18. In alternate embodiments, the method may include permanently engaging the cover 24 or not making use of a cover 24 at all.

Also disclosed herein is a method of attaching a wheel cover 18 to a rear hub. In certain embodiments, the method includes providing a rear wheel cover 18 having an axle housing 34, the axle housing 34 having a plurality of arms 46, and engaging the rear hub axle plate 38, or other structure of the rear hub, with the plurality of arms 46 of the axle housing 34. As disclosed above, the method may also include attaching the cover 24 or other indicia 62, after reading the instruction set 58.

Due to size differences in the vehicle industry, the size of the axle housing 34 or the attachment sleeve 12 may be modified to provide an appropriate fit with the rear hub axle plate 38, or nut 20, respectively. Stated another way, since the size of various attachment points disclosed herein of a vehicle may change in size depending upon the make and model of the vehicle, it is within the scope of the present invention that the modification to the size of the invention disclosed herein may be provided in order to practice the present invention.

All references, publications, and patents disclosed herein are expressly incorporated by reference.

Thus it is seen that the apparatus, kit, and method of the present invention readily achieves the ends and advantages mentioned as well as those inherent therein. While certain preferred embodiments of the invention have been illustrated and described for purposes of the present disclosure, numerous changes in the arrangement and construction of the parts may be made by those skilled in the art which changes are encompassed within the scope and spirit of the present invention as described by the following claims.

Thus, although there have been described particular embodiments of the present invention of a new and useful Wheel Trim Hub Cover, it is not intended that such references be construed as limitations upon the scope of this invention except as set forth in the following claims.

What is claimed is:

1. A wheel cover attachment device, comprising:
    a wheel cover having a flange and a tubular body, the tubular body having an interior surface, a distal end positioned distal from the flange, and a proximate end positioned proximate to the flange; and
    an arm attached substantially parallel to the interior surface of the tubular body, the arm having a body between a first end and a second end, the body being separated from the interior surface and compressible toward the interior surface between the first and second ends.

2. The device of claim 1, wherein the first end is attached to the interior surface of the tubular body.

3. The device of claim 2, wherein the second end of the arm contacts the proximate end of the tubular body.

4. The device of claim 3, wherein the body of the arm is separated from the interior surface of the tubular body by from about 5 mm to about 20 mm.

5. An apparatus for attaching a wheel cover to a rear hub axle plate of a wheel of a vehicle, comprising:
    a wheel cover having a flange portion and a tubular body having a length, the tubular body having a cylindrical interior surface;
    a plurality of arms attached to the cylindrical interior surface of the tubular body along the length of the tubular body, wherein the plurality of arms having a body separated from the cylindrical interior surface for frictionally engaging the rear hub axle plate; and an attachment cylinder attached to the flange portion of the wheel cover.

6. The apparatus of claim 5, wherein each of the plurality of arms has a first end, a second end and a body located therebetween; the body separated from the interior surface, wherein the body is capable of flexing in a direction of the interior surface of the tubular body.

7. The apparatus of claim 6, wherein the attachment cylinder has a rib for engaging a nut.

8. The apparatus of claim 7, wherein the attachment cylinder has an engagement end, wherein the engagement end has a plurality of notches for the nut.

9. The apparatus of claim 8, wherein the rib is a line of engagement for engagement with the nut.

10. An apparatus for attaching a wheel cover to a rear hub axle plate of a wheel of a vehicle, comprising:
   a wheel cover having a tubular body having a cylindrical interior surface having an axis;
   an arm attached to the cylindrical interior surface of the tubular body, wherein the arm includes a body positioned substantially parallel to the axis and separated from the cylindrical interior surface for frictionally engaging the rear hub axle plate.

11. The apparatus of claim 10 further comprising a plurality of arms attached to the cylindrical interior surface of the tubular body, wherein the arms each have a body separated from the cylindrical interior surface for frictionally engaging the rear hub axle plate.

12. The apparatus of claim 10 further comprising the arm having a first end attached to the interior surface.

13. A wheel cover attachment device, comprising:
   a wheel cover having a flange and a tubular body, the tubular body having an interior surface, a distal end positioned distal from the flange, and a proximate end positioned proximate to the flange; and
   an arm attached to the interior surface of the tubular body at a first end and contacting the proximate end of the tubular body at a second end, the arm having a body between the first end and the second end, the body being separated from the interior surface by from about 5 mm to about 20 mm and compressible toward the interior surface between the first and second ends.

14. An apparatus for attaching a wheel cover to a rear hub axle plate of a wheel of a vehicle, comprising:
   a wheel cover having a flange portion and a tubular body having a length, the tubular body having a cylindrical interior surface;
   a plurality of arms attached to the cylindrical interior surface of the tubular body along the length of the tubular body, wherein the plurality of arms have a body separated from the cylindrical interior surface for frictionally engaging the rear hub axle plate, wherein each of the plurality of arms has a first end, a second end and a body located therebetween, the body separated from the interior surface and capable of flexing in a direction of the interior surface of the tubular body; and
   an attachment cylinder attached to the flange portion of the wheel cover, the attachment cylinder having a rib for engaging a nut.

15. The apparatus of claim 14, wherein the attachment cylinder has an engagement end, wherein the engagement end has a plurality of notches for the nut.

16. The apparatus of claim 14, wherein the rib is a line of engagement for engagement with the nut.

* * * * *